(12) United States Patent
Robinson et al.

(10) Patent No.: US 8,817,198 B2
(45) Date of Patent: Aug. 26, 2014

(54) BOUNDARY ARTIFACT SUPPRESSION IN SEGMENTED LIQUID CRYSTAL MODULATORS

(75) Inventors: Michael G. Robinson, Boulder, CO (US); Douglas J. McKnight, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 236 days.

(21) Appl. No.: 13/536,058

(22) Filed: Jun. 28, 2012

(65) Prior Publication Data

US 2013/0002996 A1  Jan. 3, 2013

Related U.S. Application Data

(60) Provisional application No. 61/502,807, filed on Jun. 29, 2011.

(51) Int. Cl.
*G02F 1/1335* (2006.01)

(52) U.S. Cl.
USPC .............................. 349/15; 348/58

(58) Field of Classification Search
CPC .................................... G02B 27/2214
USPC .............................. 349/15; 348/58
See application file for complete search history.

(56) References Cited

U.S. PATENT DOCUMENTS

| 4,281,341 A | 7/1981 | Byatt |
| 6,118,584 A * | 9/2000 | Van Berkel et al. .......... 359/463 |
| 6,975,345 B1 | 12/2005 | Lipton |

OTHER PUBLICATIONS

Jung, Sung-Min et al., Novel Active Retarder 3D Displays Having Full Resolution and High Brightness with Polarizer Glasses, LG Display (Republic of Korea), SD&A 2011 conference proceedings, pp. 7863-20.

* cited by examiner

*Primary Examiner* — Phu Vu
(74) *Attorney, Agent, or Firm* — Neil G. Mothew; Darlene K. Kondo

(57) ABSTRACT

Disclosed herein are apparatuses and related methods for avoiding liquid crystal molecule twisting through local boundary orientation relevant to the alignment direction of liquid crystal structures. In one embodiment, a segmented polarization control panel may comprise a plurality of segment electrodes corresponding to a plurality of display segments of the sequentially scanning display. The plurality of segment electrodes comprise liquid crystals therein, and are arranged contiguously in a direction of the sequential scan. Electrode boundaries are created between adjacent segment electrodes, where each may be cascaded substantially parallel and perpendicular to a liquid crystal alignment direction of liquid crystals located within the segments. Preventing twisting by the disclosed techniques is particularly attractive in active retarder display systems employing fast striped pi-cell modulators.

20 Claims, 10 Drawing Sheets

US 8,817,198 B2

BOUNDARY ARTIFACT SUPPRESSION IN SEGMENTED LIQUID CRYSTAL MODULATORS

CROSS-REFERENCE TO RELATED APPLICATIONS

This disclosure is a non-provisional conversion of, and thus claims priority to, U.S. Provisional Patent Application No. 61/502,807, entitled "Boundary Artifact Suppression in Segmented Liquid Crystal Modulators," filed Jun. 29, 2011, which is incorporated herein by reference in its entirety.

TECHNICAL FIELD

This disclosure generally relates to displays, and more specifically relates to stereoscopic flat panel displays having a liquid crystal (LC) modulation panel and a polarization control panel (PCP).

BACKGROUND

Stereoscopic systems operate by presenting two distinct images to a viewer, a first image being presented to the right eye and a second image being presented to the left eye. Polarization or spectral-division methods may be used to separate the two images. The right-eye and left-eye images may be coded with orthogonal polarizations at an image source, and viewer polarization optics may allow light of orthogonal polarization states to be passed onto different eyes, thereby creating the perception of 3D images.

Some conventional techniques for modulating polarization for a stereoscopic display are described by Lipton in commonly-owned U.S. Pat. No. 6,975,345 ("Lipton '345"), and by Byatt in U.S. Pat. No. 4,281,341 ("Byatt '341"), both of which are incorporated herein by reference in their entirety. In general, Lipton '345 describes a polarizing modulator for use in an electronic stereoscopic display system having a sequentially scanning display that includes a plurality of liquid crystal (LC) segments arranged contiguously in a direction of the sequential scan. The liquid crystal material used in each polarization modulation segment has its phase shift tuned in an attempt to minimize the perception of a visible line between segments. Byatt '341 describes a stereoscopic television system that employs a switchable optical polarizer to alternately form images corresponding to the left and right eyes on a television camera. A corresponding switchable polarizer, which comprises a liquid crystal cell containing a thin layer of twisted nematic liquid crystal material, is used in combination with a display device to produce alternating images that are vertically or horizontally polarized. The switchable polarizer associated with the display device is switched in synchronism with the operation of the switchable polarizer associated with the camera.

Unfortunately, despite prior attempts at solutions, the boundaries between the horizontally striped electrodes of an active retarder stereoscopic display are often visible as the LC molecules twist under the influence of in-plane electric fields at the boundary between adjacent segments. Accordingly, what is needed is a technique for avoiding such twisting and thus reducing the visibility of segment boundaries.

BRIEF SUMMARY

In order to overcome deficiencies found in conventional approaches, disclosed herein are apparatuses and related methods for avoiding LC molecule twisting through local boundary orientation relevant to LC structures including zero twist LC homogeneously aligned modulation modes, where global boundaries are neither parallel nor perpendicular to the alignment direction. Preventing twisting by the disclosed technique is particularly attractive in active retarder display systems employing fast striped pi-cell modulators.

In one aspect, segmented polarization control panels (PCP) for use with an electronic stereoscopic display system having a sequentially scanning display are disclosed herein. In one embodiment, such segmented PCP may comprise a plurality of segment electrodes corresponding to a plurality of display segments of the sequentially scanning display, wherein the plurality of segment electrodes arranged contiguously in a direction of the sequential scan. Within such a segmented PCP, electrode boundaries between adjacent segment electrodes may each be oriented or cascaded substantially parallel and perpendicular to a liquid crystal alignment direction of liquid crystals located within the segments of the segmented PCP.

In exemplary embodiments, the liquid crystal alignment direction of the liquid crystals located within the segments of the segmented PCP is about 45° relative to a length of a segment of the segmented PCP. In some embodiments, boundary sections of each of the electrode boundaries extending parallel and perpendicular to the liquid crystal alignment direction are substantially equal in length. In other embodiments, boundary sections of each of the electrode boundaries extending parallel and perpendicular to the liquid crystal alignment direction have one or more pseudo-random lengths. In still other embodiments, boundary sections of each of the electrode boundaries extending parallel and perpendicular to the liquid crystal alignment direction have one or more unequal lengths, or may have repeating patterns of unequal lengths, such as short-short-long-long, or other patterns.

In another aspect, methods of manufacturing a segmented polarization control panel for use with an electronic stereoscopic display system having a sequentially scanning display are disclosed. In one embodiment, such a method may comprise providing a plurality of segment electrodes corresponding to a plurality of display segments of the sequentially scanning display, and arranging the plurality of segment electrodes contiguously in a direction of the sequential scan of the stereoscopic display system. Such a method may also include creating electrode boundaries between adjacent segment electrodes, where each of the electrode boundaries are oriented or cascaded substantially parallel and perpendicular to a liquid crystal alignment direction of liquid crystals located within the segments of the segmented PCP.

DETAILED DESCRIPTION

Figure 1:
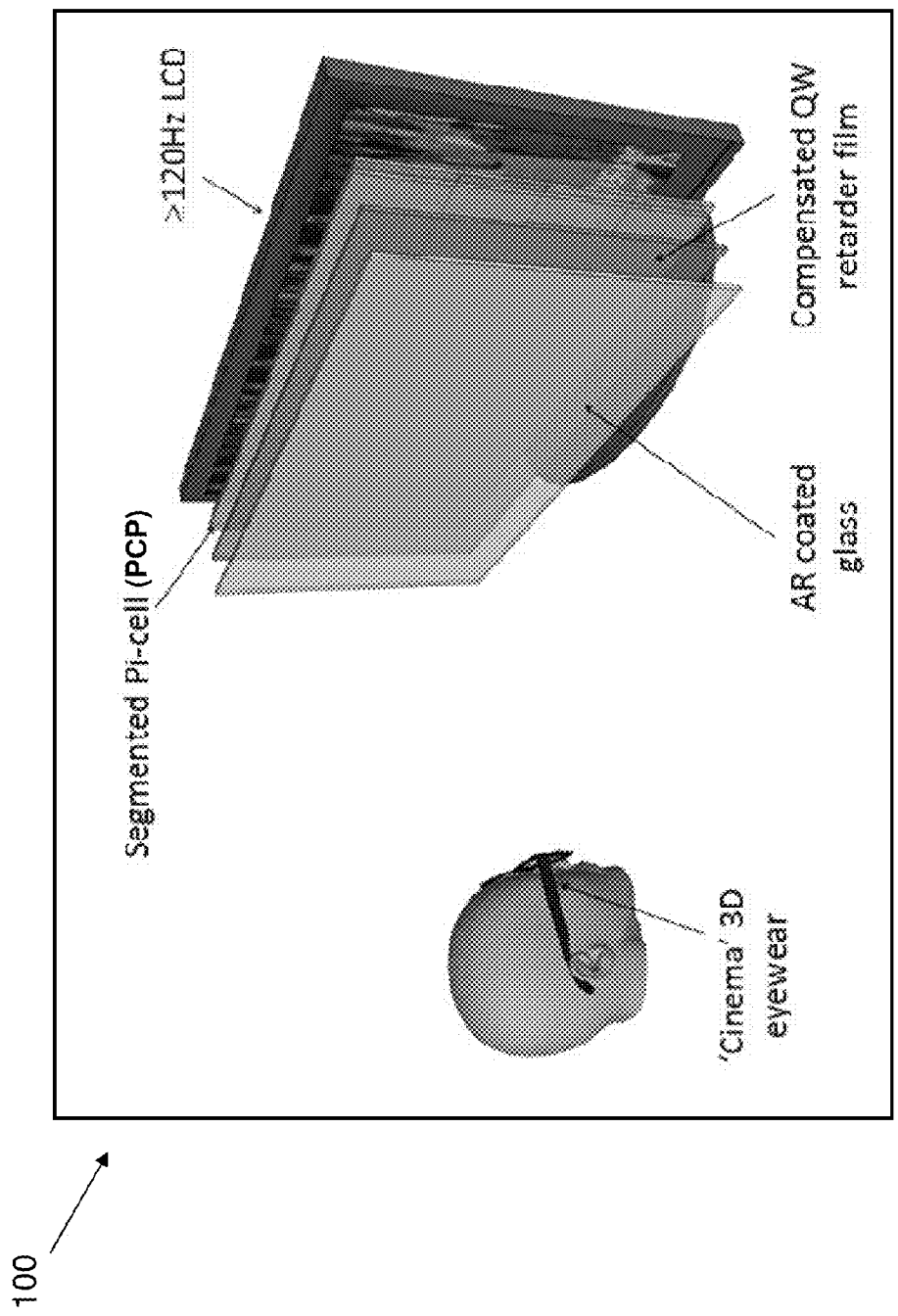
FIG. 1 is a schematic diagram showing a perspective diagram of an exemplary active retarder display system.

FIG. 1 is a schematic diagram showing a perspective diagram of an exemplary active retarder display system 100. A known active retarder stereoscopic display system 100 includes a fast 120 Hz LC display onto which a synchronized segmented polarization control panel (PCP) is attached (illustrated as a Pi-Cell). See, e.g., Sung-Min Jung et al., *Novel Active Retarder 3D Displays Having Full Resolution And High Brightness With Polarizer Glasses*, LG Display (Republic of Korea), SD&A 2011 conference proceedings, pp. 7863-20, herein incorporated by reference in its entirety. As shown in FIG. 1, the PCP includes a display-sized, segmented, zero-twist liquid crystal (ZTLC) modulation cell laminated with a quarter-wave (QW) retarder film. FIG. 1 shows a pi-cell as a preferred ZTLC mode since it is a faster known switching nematic mode, although other ZTLC modes can be considered such as an anti-parallel aligned electrically controlled birefringent (ECB) cell. In systems that match to conventional cinema eyewear, the alignment of the PCP's ZTLC modulation cell and its orthogonally oriented quarter wave laminate is ±45° degrees to the vertical.

Figure 2:
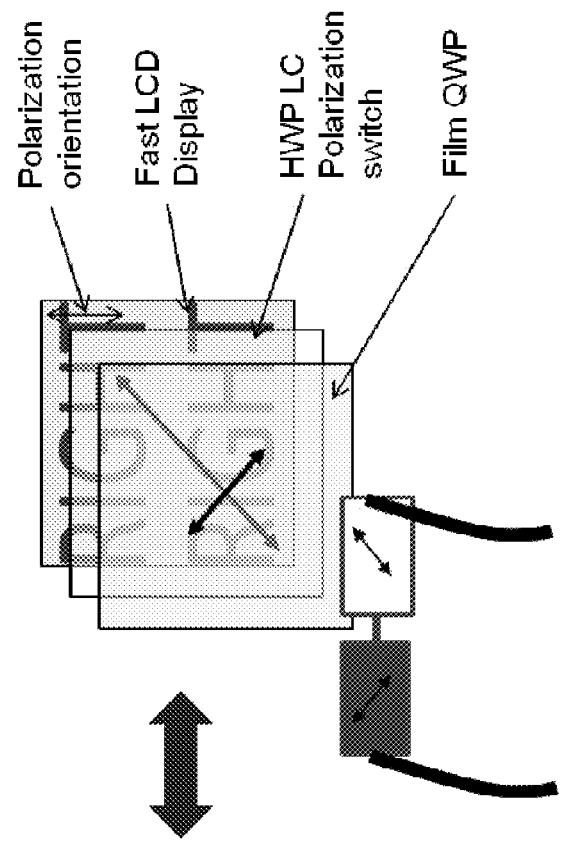
FIG. 2 is a schematic diagram showing polarization modulation on the active retarder display system using a polarization control panel and passive eyewear to decode the left and right images to the left and right eyes, respectively.
Figure 2:
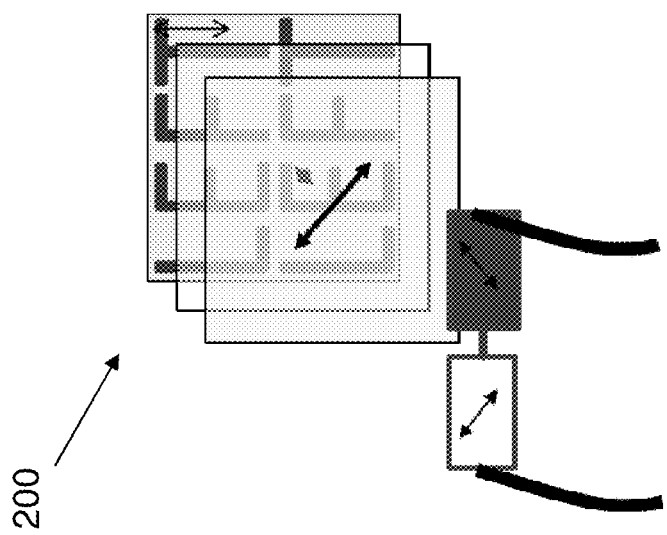

FIG. 2 is a schematic diagram showing polarization modulation on an active retarder display system 200 using a polarization control panel (PCP) to encode, and passive eyewear to decode the left and right images to the left and right eyes, respectively. Its basic modulation operation is summarized in FIG. 2. When the LC is driven with an applied high voltage, its birefringence effectively disappears revealing the net quarter-wave retardance of the laminate film (Film QWP). Circularly polarized cinema eyewear then blocks the resultant encoded display light from entering one eye while allowing it to be seen by the other. Reducing the applied voltage introduces birefringence into the LC component. At the specific low voltage where the net LC retardance is a half-wave, the blocking and transmitting of encoded display light is then switched between the eyewear lenses (HWP LC Polarization Switch). Stepping between these voltage states in synchronization with left and right eye displayed stereoscopic images enables the wearer of the eyewear to experience 3D. It should be understood that most liquid crystal materials respond to the magnitude of the applied electric field, and are, to a good approximation, insensitive to the sign. So, "low" and "high" voltages should be understood to refer to low and high magnitudes of voltage, such as 3.5V and 25V, of either sign with respect to the common electrode voltage.

Figure 3:
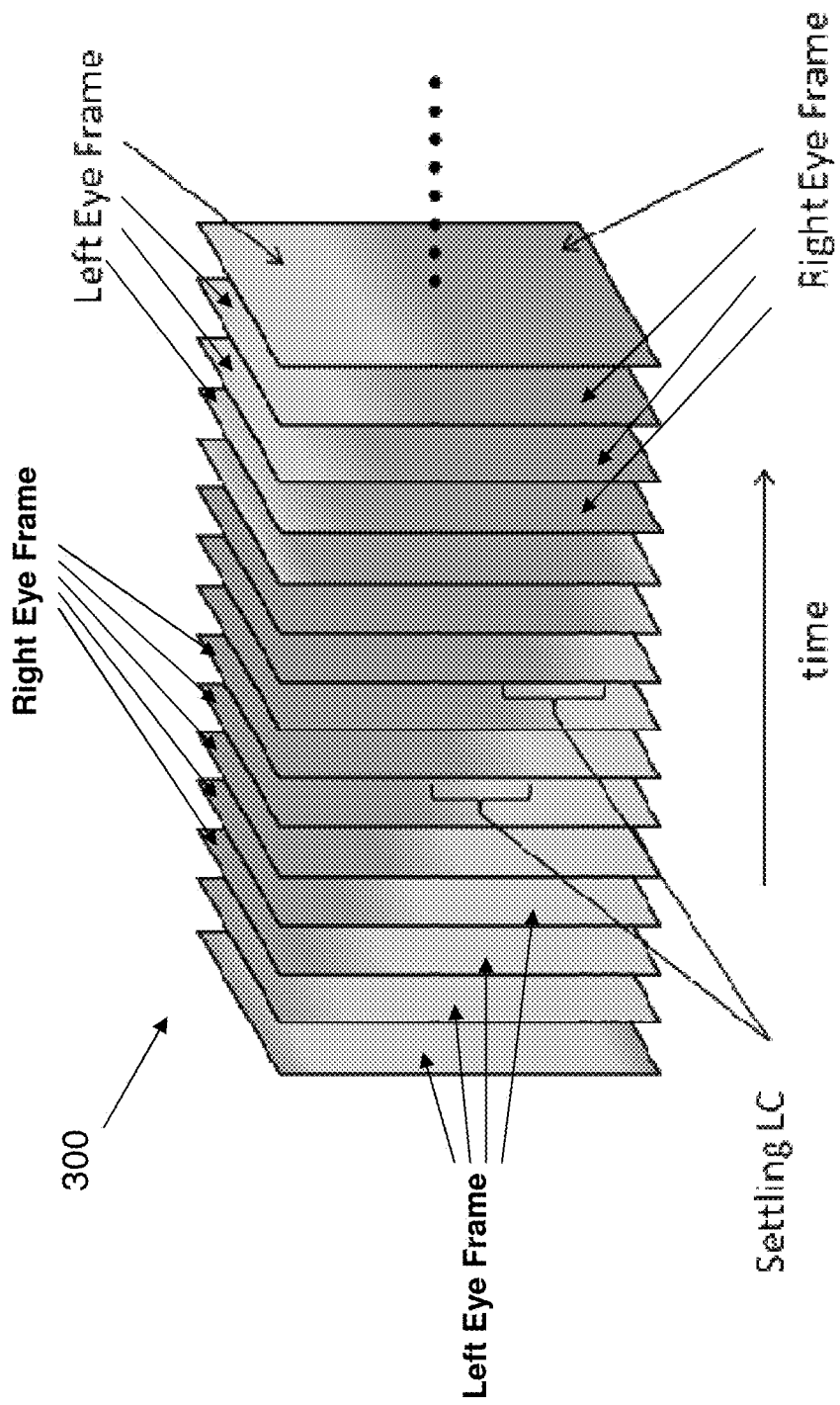
FIG. 3 is a schematic diagram showing a series of sequential snapshots illustrating the update of a conventional LCD modulating panel.

FIG. 3 is a schematic diagram showing a series of sequential snapshots 300 illustrating the update of a conventional LCD modulating panel. Conventional LC display panels cannot generally display globally isolated sequential images since the LC does not respond instantaneously and the image data is updated on a non-global, line-by-line basis as illustrated by in FIG. 3 by the light/dark shading representing left/right eye frames, respectively. In addition, FIG. 3 illustrates the conventional update of an LCD as series of snapshots in time. Generally, at no instant is an isolated image present on the display, so a combination of scrolling modulation, and (in some cases) scrolling illumination, are typically used to modulate the different image data and to hide the LC transitioning band. Examples of various stereoscopic flat panel displays are described in commonly-owned U.S. Published Patent Application No. 2011/0032439, entitled "Stereoscopic Flat Panel Display With Updated Blanking Intervals," herein incorporated by reference in its entirety.

Figure 4:
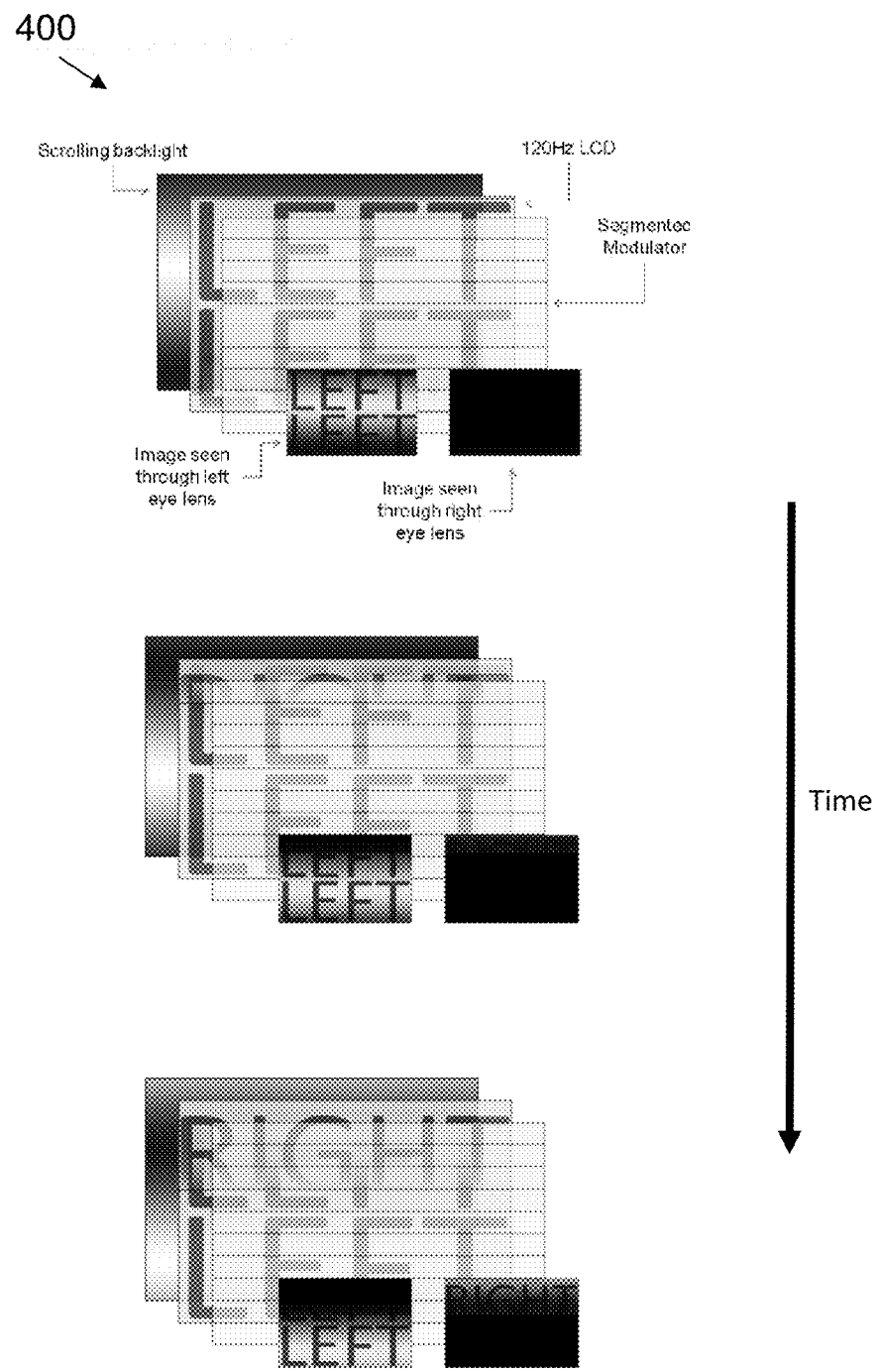
FIG. 4 is a schematic diagram showing the scrolling operation of an active retarder display system.

FIG. 4 is a schematic diagram showing the scrolling operation of an active retarder display system 400. This system 400 solution shows how a segmented PCP is updated segment-by-segment following in step the line-by-line update of a panel. At the same time, a low illumination band follows the switching LC region suppressing mixed imagery.

In a conventional stereoscopic display, the segment boundaries of the PCP are normal to the vertical addressing direction, i.e., horizontal. This, coupled with the preferred non-vertical LC alignment, leads to twisting of the LC by the vertical in-plane electric fields present when adjacent PCP segments are not in the same high or low voltage modulating states. Such twisting encodes the polarization of transmitted light into a non-ideal state of polarization (SOP) causing light within the boundary vicinity to be misdirected into viewers' eyes. These horizontal boundaries then become visible to the viewer, detracting from the otherwise excellent performance of the display.

This disclosure provides for the formation of local boundary orientations that are substantially parallel or normal to the ZTLC alignment direction. When cascaded, these local orthogonal segment borders combine to form a net horizontal serrated boundary between modulator segments.

Figure 5:
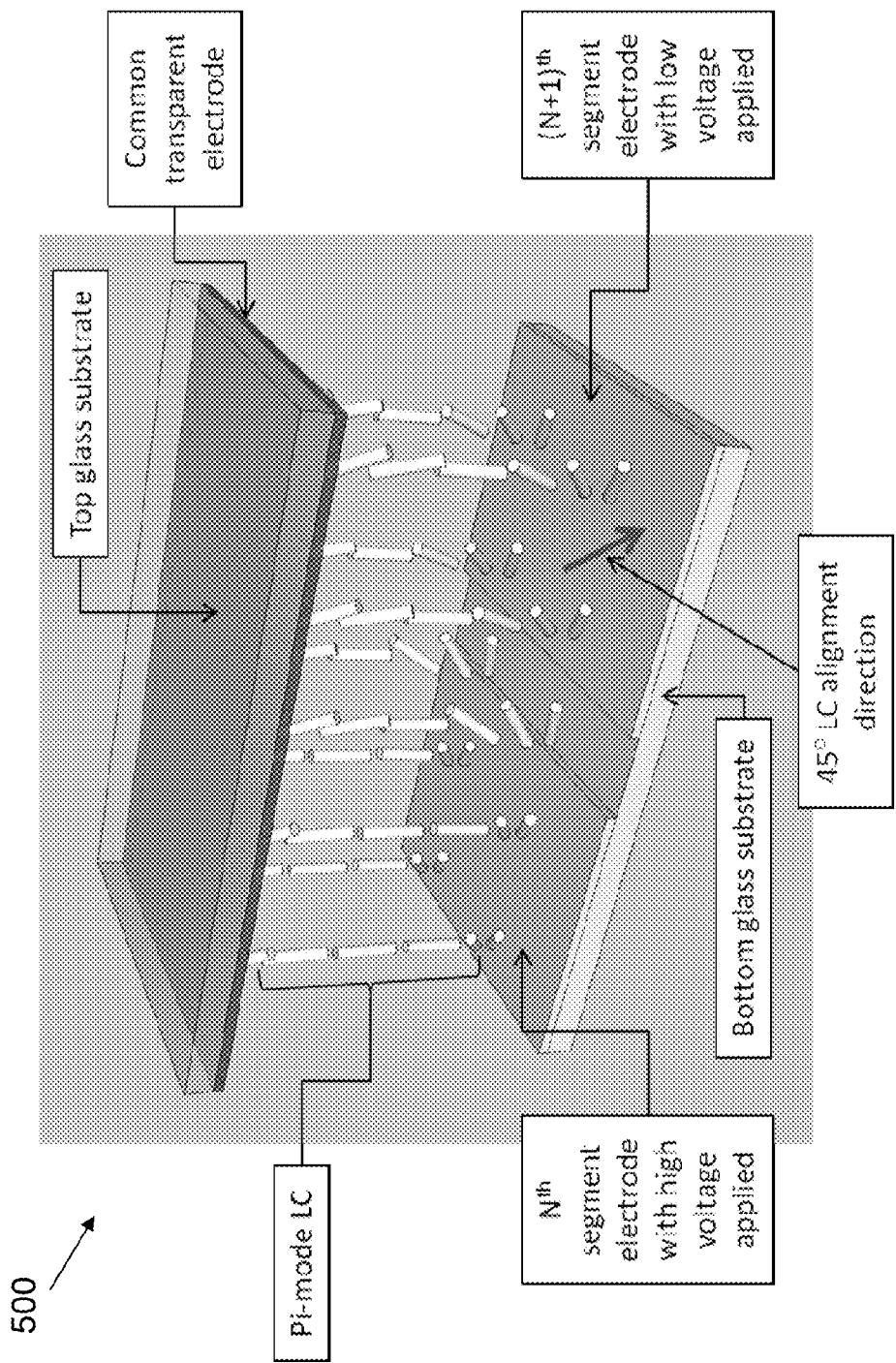
FIG. 5 is a schematic diagram showing a perspective view of the detail of a LC modulating cell segment boundary.

FIG. 5 is a schematic diagram showing a perspective view of the detail of a LC modulating cell segment boundary 500. Modulator segments are defined as regions that can be independently driven to one or other of the high and low voltage driven LC states. To achieve this, separate electrodes are typically defined for each segment on one of the glass substrates, while the other substrate retains a common electrode. Defining the segments requires having a physical separation between conducting layers (typically 10 μm in width) as shown schematically in FIG. 5. Here, the exemplary LC modulator mode is assumed to be the pi-mode, which is attractive for its transition speeds. It should be noted that this approach is not limited to the pi-mode, and acts to suppress boundary visibility in other ZTLC modes such as the anti-parallel aligned electrically controllable birefringence (ECB) LC mode. Furthermore, the approach is not limited to zero-twist modes (though they are described as they are a preferred embodiment for current systems).

Figure 6:
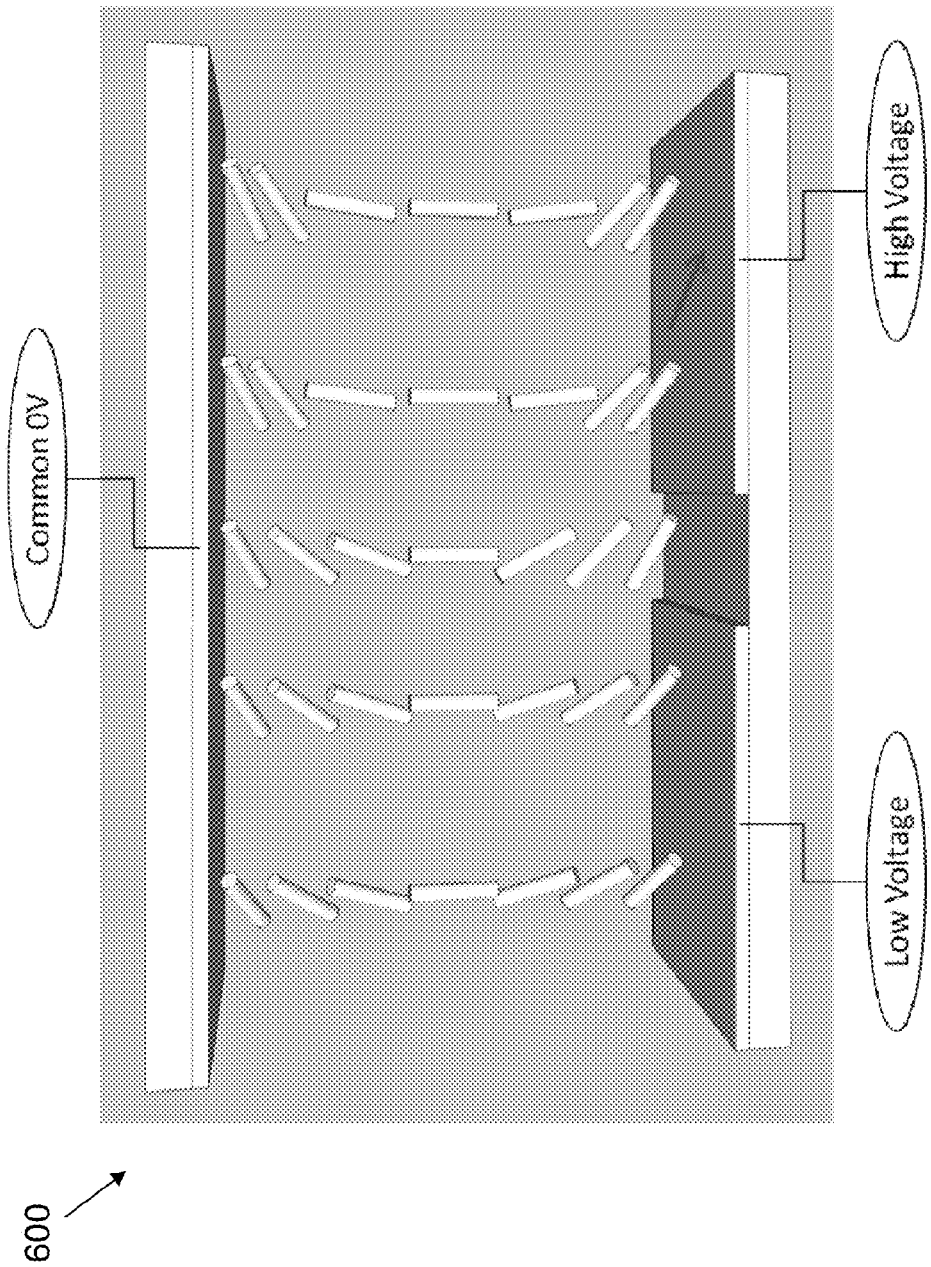
FIG. 6 is a schematic diagram showing a perspective view of LC reorientation in the pi-mode under high and low voltage drive, where the orientation of the molecules in the bulk spanning the central fixed normal LC alignment imparts retardance for polarization modulation.

FIG. 6 is a schematic diagram 600 showing a perspective view of LC reorientation in the pi-mode under high and low voltage drive, where the orientation of the molecules in the bulk spanning the central fixed normal LC alignment imparts retardance for polarization modulation. During the scrolling operation, different voltages are applied to adjacent electrodes causing the LC to reorient as shown in FIG. 6. In the illustrated pi-mode, substantially only that LC that lies in the region between the midpoint of the cell and the substrate boundaries switch, which is the reason for the speed of its modulation but also the subtlety of the visualization in the figure. The LC that is situated in the gap between the segment-defining electrodes experiences a twisting torque due to the in-plane fields. This twisting produces light with a mixed polarization state that leaks into both eyes of a 3D viewer wearing suitable analyzing eyewear. Furthermore, untwisting LC molecules can take several milliseconds, thereby making the mixed modulation and the subsequent visibility of the boundaries effectively permanent in typical active retarder 3D displays operated at about 120 Hz.

Figure 7:
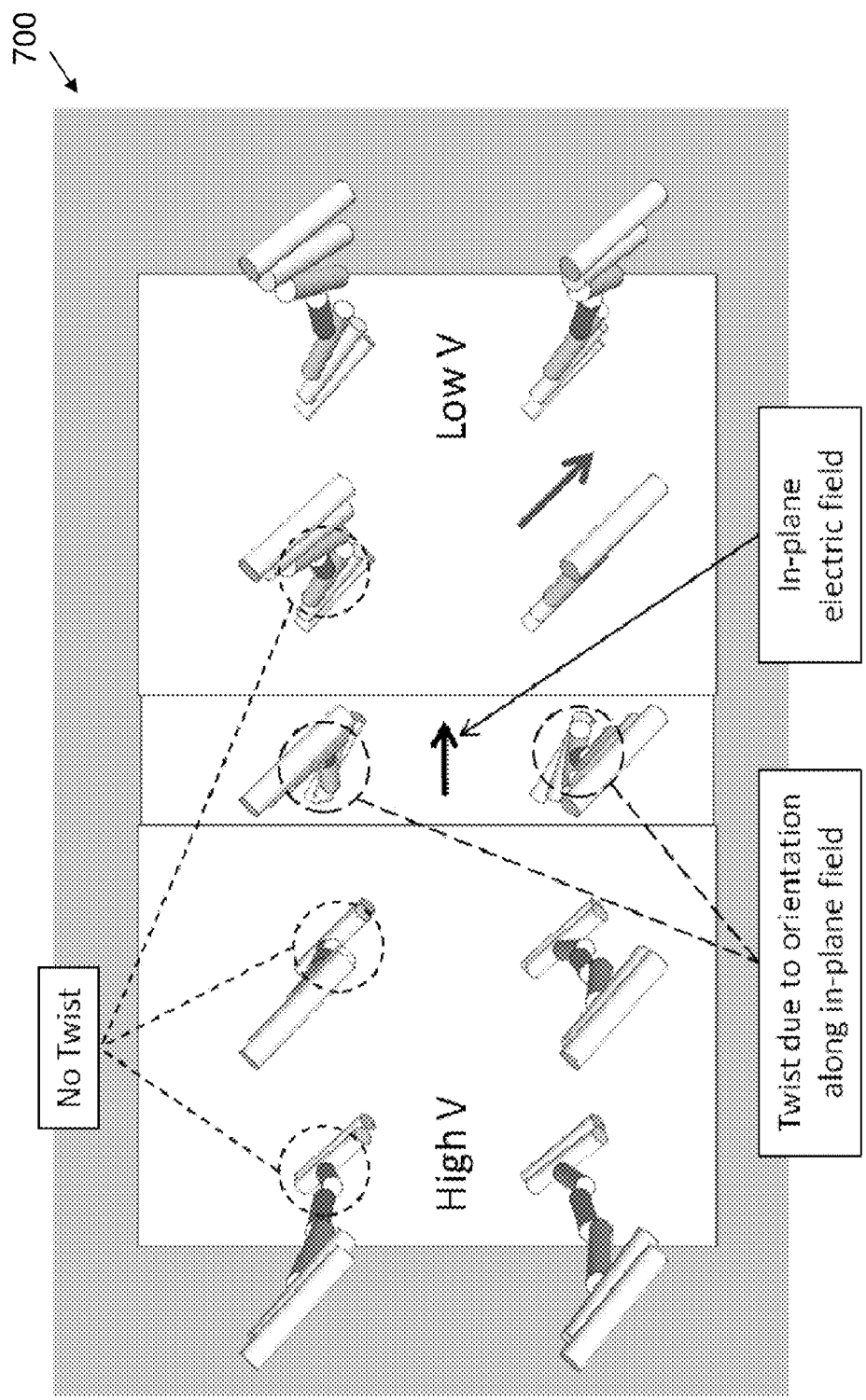
FIG. 7 is a schematic diagram of a top view of an LC modulation cell showing twisting in the LC situated between segment-defining electrodes.

FIG. 7 is a schematic diagram of a top view of an LC modulation cell 700 showing twisting in the LC situated between segment-defining electrodes. It should be understood that the situation in reality is more complex through the natural tendency for the pi-mode alignment to twist and lose the centrally normal LC orientation (not shown in the figure). Coupling to the natural tendency for the LC to twist can result in regions where the LC in not optimally oriented spreading over the bounding electrodes and having reversal times closer to seconds rather than milliseconds. Reducing twist is therefore paramount in a pi-mode situation.

Figure 8:
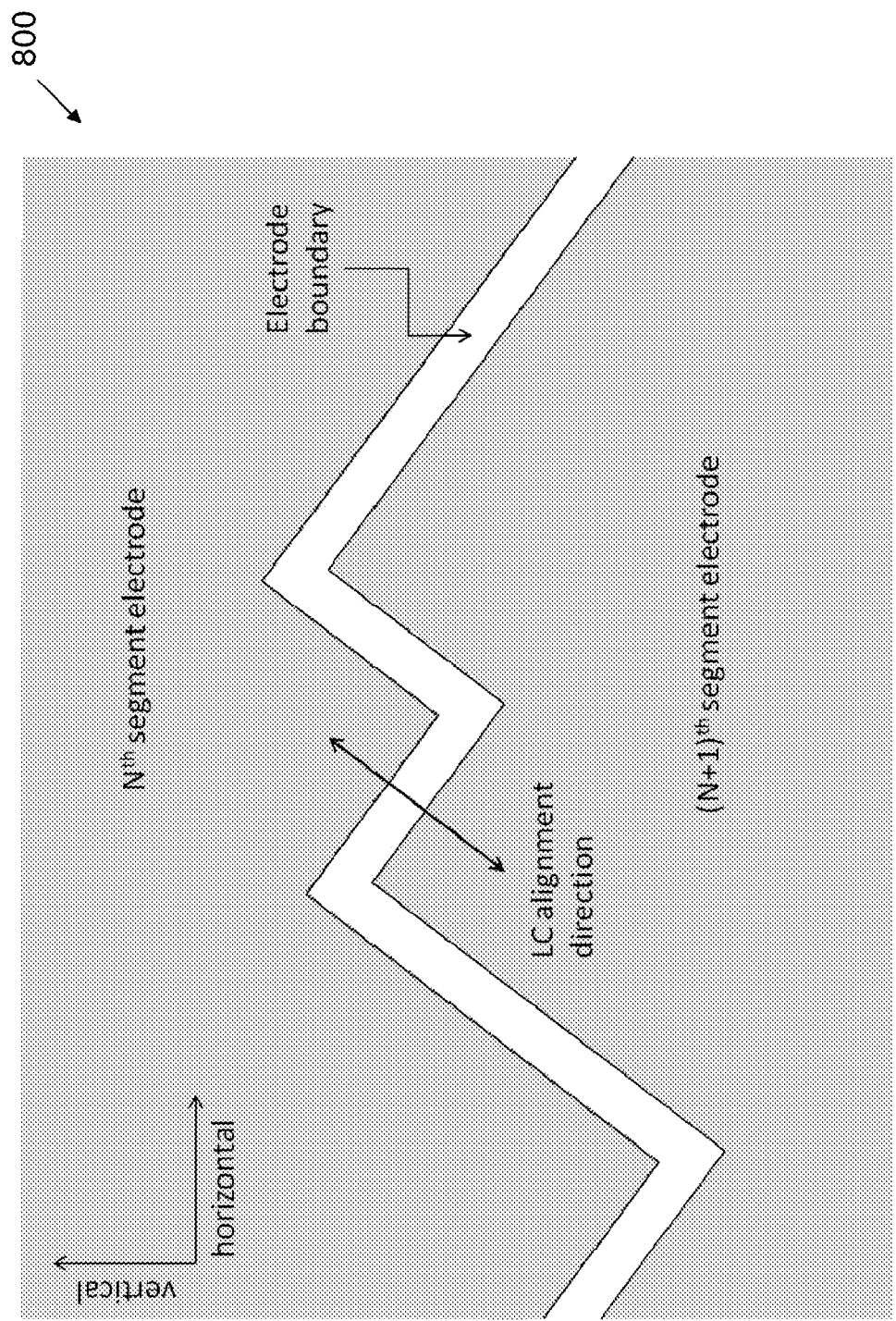
FIG. 8 is a schematic diagram of an exemplary electrode segment boundary patterning embodiment, in accordance with the present disclosure.

FIG. 8 is a schematic diagram 800 of an exemplary embodiment of electrode patterning in accordance with the disclosed principles. This exemplary embodiment shows a cascaded zig-zag electrode boundary between adjacent segment electrodes that provides in-plane fields that are parallel or normal to the LC alignment direction (as illustrated). As such, LC molecules do not experience molecular torque and remain oriented along the original alignment direction. In practice, those fields that lie normal to the LC alignment direction can provide torque in the case of non-perfect alignment as it is an unstable situation. Fortunately, the time taken to initiate rotation from this unstable situation is sufficiently large as to avoid significant twist before the in-plane field is removed.

Figure 9:
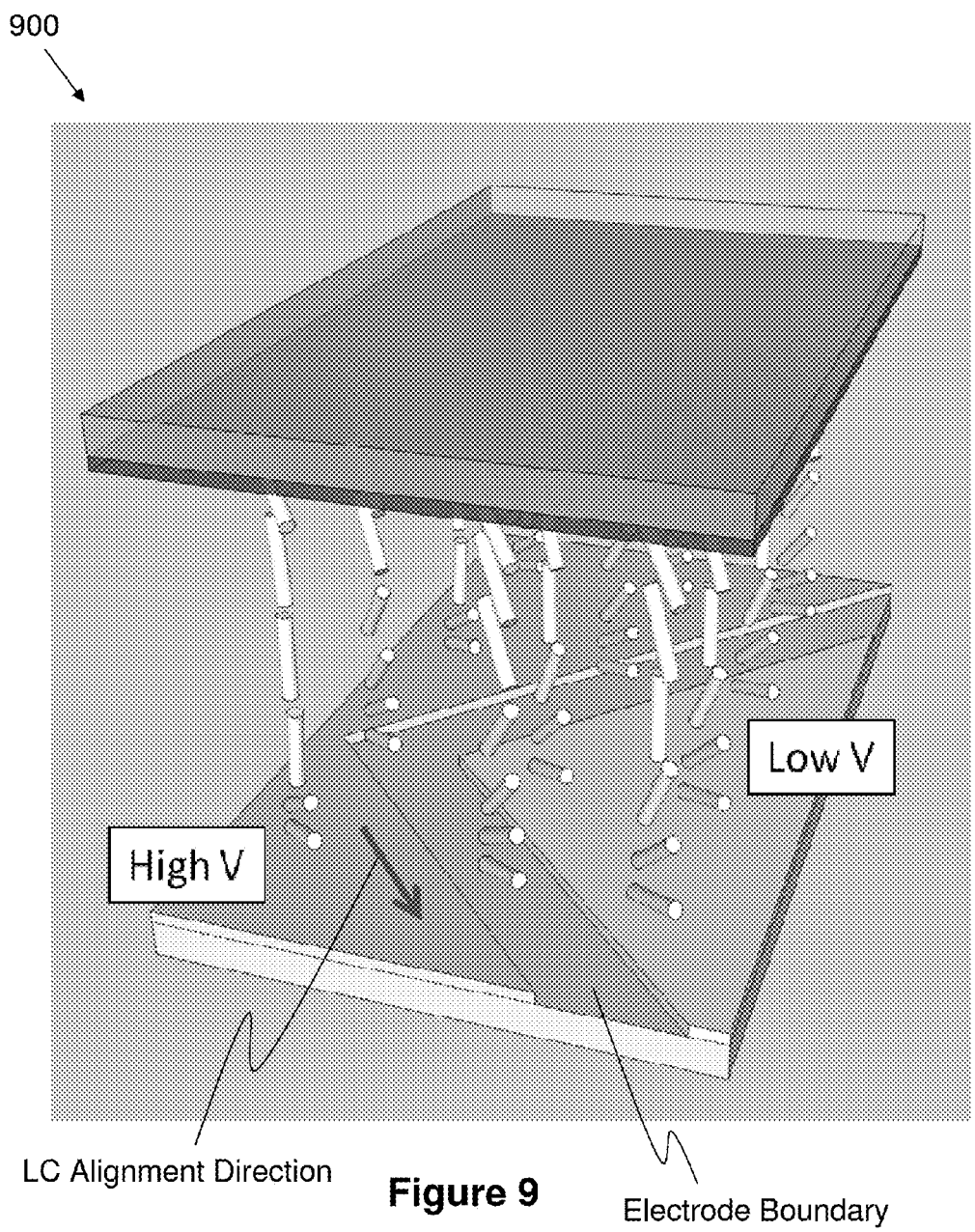
FIG. 9 is a schematic diagram showing a perspective view of a segment boundary patterning, illustrating the realignment of LC molecules without introducing twist, in accordance with the present disclosure.
Figure 10:
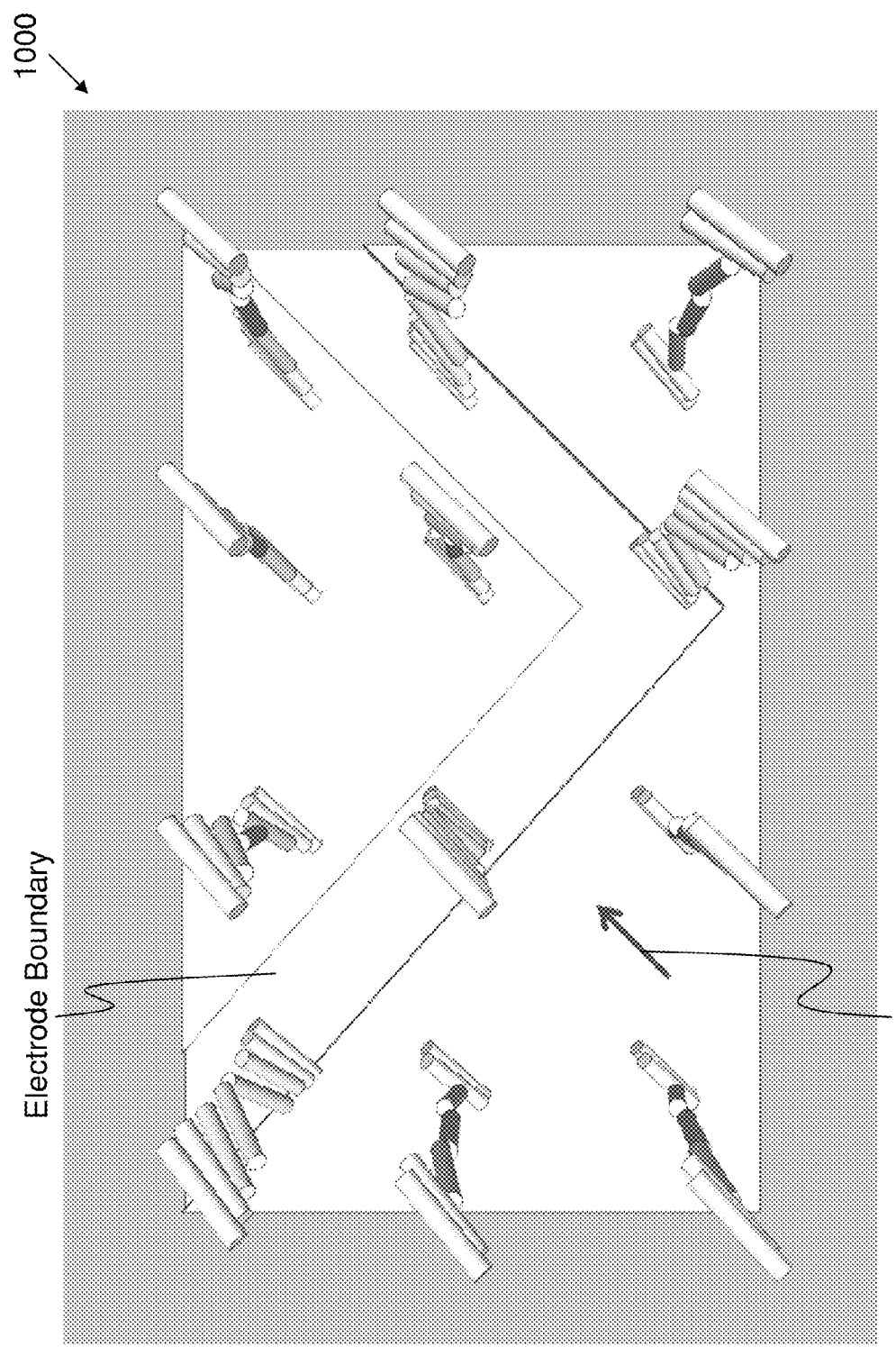
FIG. 10 is a schematic diagram showing a top view of the LC cell shown in FIG. 9.

FIG. 9 is a schematic perspective diagram 900 and FIG. 10 is a top view diagram 1000 showing LC re-orientation while different voltages are applied to adjacent segment electrodes. The zig-zag nature of the boundaries ensure in-plane fields are aligned substantially normal or parallel to the LC alignment direction, removing any twisting torque on LC molecules. In the case of a twisted LC mode, the boundary zig-zags can be arranged substantially parallel and perpendicular to the LC alignment direction on the substrate containing the electrode gap.

A macroscopic horizontal boundary, as well as pseudo-random alignment of points where the boundary changes direction, can be achieved by linking together pseudo-random lengths of the orthogonally oriented boundary sections. Irregular positioning of where the boundary direction changes acts to suppress the visibility of any resulting defects in the LC orientation formed at these locations. In other embodiments, the orthogonally aligned boundary sections of each of the electrode boundaries extending parallel and perpendicular to the liquid crystal alignment direction are substantially equal in length. In some embodiments, the boundary sections of the plurality of electrode boundaries, whether having random lengths or substantially equal lengths, are all correspondingly aligned with one another.

Although the figures indicate a 45° alignment of the ZTLC relative to the vertical, this approach is applicable to any modulation situation where the macroscopic LC boundaries are at an angle other than 0° and 90° to the LC alignment. Also, it is expected that there will be some residual boundary defects, not least from the reduction of electric fields within the segment boundaries even when adjacent segments are driven equivalently. And though expected to be invisible in most cases, these and other artifacts are expected to be reduced further with complementary modulation schemes.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A segmented polarization control panel (PCP) for use with an electronic stereoscopic display system having a sequentially scanning display, the segmented PCP comprising:
    a plurality of segment electrodes corresponding to a plurality of display segments of the sequentially scanning display, the plurality of segment electrodes arranged contiguously in a direction of the sequential scan;
    wherein electrode boundaries between adjacent segment electrodes are each oriented substantially parallel and perpendicular to a liquid crystal alignment direction of liquid crystals located within the segments of the segmented PCP.

2. A segmented PCP in accordance with claim 1, wherein boundary sections of each of the electrode boundaries extending parallel and perpendicular to the liquid crystal alignment direction are cascaded substantially equal in length.

3. A segmented PCP in accordance with claim 1, wherein boundary sections of each of the electrode boundaries extending parallel and perpendicular to the liquid crystal alignment direction have one or more pseudo-random or one or more unequal lengths.

4. A segmented PCP in accordance with claim 1, wherein the liquid crystal alignment direction of liquid crystals located within the segments of the segmented PCP is about 45° relative to a length of a segment of the segmented PCP.

5. A segmented PCP in accordance with claim 1, wherein the segmented PCP is configured for use with an active retarder display system.

6. A segmented PCP in accordance with claim 5, wherein the active retarder display system employs fast striped pi-cell modulators.

7. A segmented PCP in accordance with claim 1, wherein segment electrodes on opposing sides of one of the electrode boundaries are configured to receive alternating high and low voltages, respectively, corresponding to the display of alternating left-eye and right-eye images of a stereoscopic image.

8. A method of manufacturing a segmented polarization control panel (PCP) for use with an electronic stereoscopic display system having a sequentially scanning display, the method comprising:
    providing a plurality of segment electrodes corresponding to a plurality of display segments of the sequentially scanning display;
    arranging the plurality of segment electrodes contiguously in a direction of the sequential scan of the stereoscopic display system;
    creating electrode boundaries between adjacent segment electrodes, each of the electrode boundaries oriented substantially parallel and perpendicular to a liquid crystal alignment direction of liquid crystals located within the segments of the segmented PCP.

9. A method in accordance with claim 8, wherein creating electrode boundaries further comprises creating cascaded boundary sections of each of the electrode boundaries extending parallel and perpendicular to the liquid crystal alignment direction substantially equal in length.

10. A method in accordance with claim 8, wherein creating electrode boundaries further comprises creating boundary sections of each of the electrode boundaries extending parallel and perpendicular to the liquid crystal alignment direction to have one or more pseudo-random or one or more unequal lengths.

11. A method in accordance with claim 8, wherein the liquid crystal alignment direction of liquid crystals located within the segments of the segmented PCP is about 45° relative to a length of a segment of the segmented PCP.

12. A method in accordance with claim 8, wherein providing a plurality of segment electrodes corresponding to a plurality of display segments of the sequentially scanning display further comprises providing a plurality of segment electrodes configured for use with an active retarder display system.

13. A method in accordance with claim 12, wherein the active retarder display system employs fast striped pi-cell modulators.

14. A method in accordance with claim 8, wherein providing a plurality of segment electrodes corresponding to a plurality of display segments of the sequentially scanning display further comprises providing segment electrodes on opposing sides of one of the electrode boundaries configured to receive alternating high and low voltages, respectively, corresponding to the display of alternating left-eye and right-eye images of a stereoscopic image.

15. A segmented polarization control panel (PCP) for use with an electronic stereoscopic display system having a sequentially scanning display, the segmented PCP comprising:
    a plurality of bottom electrodes corresponding to a plurality of display segments of the sequentially scanning display and arranged contiguously in a direction of the sequential scan;
    a common upper electrode shared by the plurality of bottom electrodes, wherein the segmented PCP comprises liquid crystals located between the upper electrode and plurality of bottom electrodes; and
    electrode boundaries located between adjacent bottom electrodes, each of the electrode boundaries orthogonally oriented substantially parallel and perpendicular to a liquid crystal alignment direction of the liquid crystals located within the segments of the segmented PCP;
    wherein bottom electrodes on opposing sides of one of the electrode boundaries are configured to receive alternating high and low voltages, respectively, corresponding to the display of alternating left-eye and right-eye images of a stereoscopic image.

16. A segmented PCP in accordance with claim 15, wherein boundary sections of each of the electrode boundaries extending parallel and perpendicular to the liquid crystal alignment direction are cascaded substantially equal in length.

17. A segmented PCP in accordance with claim 15, wherein boundary sections of each of the electrode boundaries extending parallel and perpendicular to the liquid crystal alignment direction have one or more pseudo-random or one or more unequal lengths.

18. A segmented PCP in accordance with claim 15, wherein the liquid crystal alignment direction of liquid crystals located within the segments of the segmented PCP is about 45° relative to a length of a segment of the segmented PCP.

19. A segmented PCP in accordance with claim 15, wherein the segmented PCP is configured for use with an active retarder display system.

20. A segmented PCP in accordance with claim 19, wherein the active retarder display system employs fast striped pi-cell modulators.

* * * * *